May 9, 1933.   C. KNOWLES   1,907,550
VERTICAL SPINDLE MACHINE TOOL
Filed Jan. 2, 1931   3 Sheets-Sheet 1
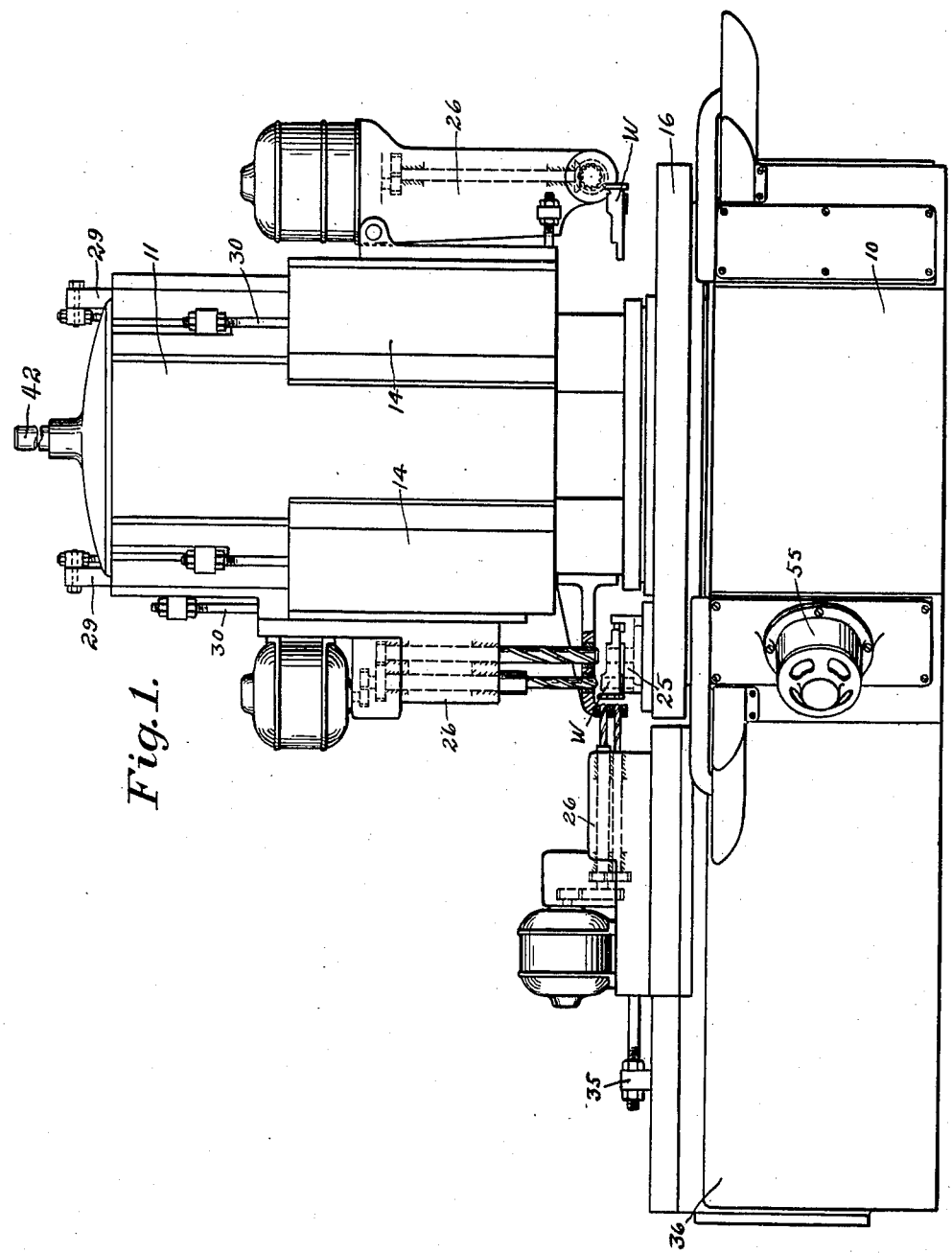
INVENTOR
Carroll Knowles
BY
Joseph K. Schofield
ATTORNEY May 9, 1933.  C. KNOWLES  1,907,550
VERTICAL SPINDLE MACHINE TOOL
Filed Jan. 2, 1931   3 Sheets-Sheet 2
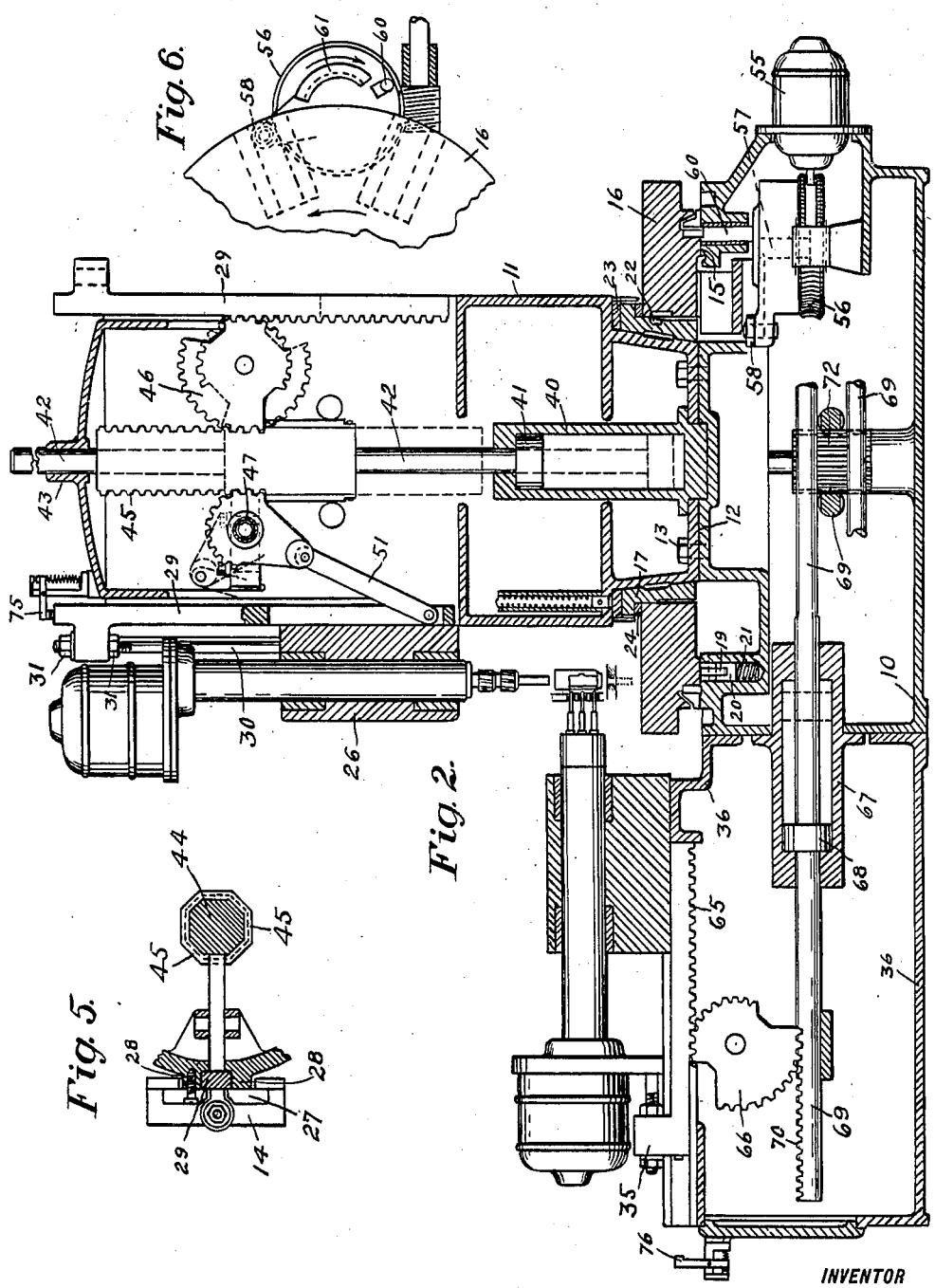
INVENTOR
Carroll Knowles
BY
Joseph K. Schofield
ATTORNEY May 9, 1933.  C. KNOWLES  1,907,550
VERTICAL SPINDLE MACHINE TOOL
Filed Jan. 2, 1931  3 Sheets-Sheet 3
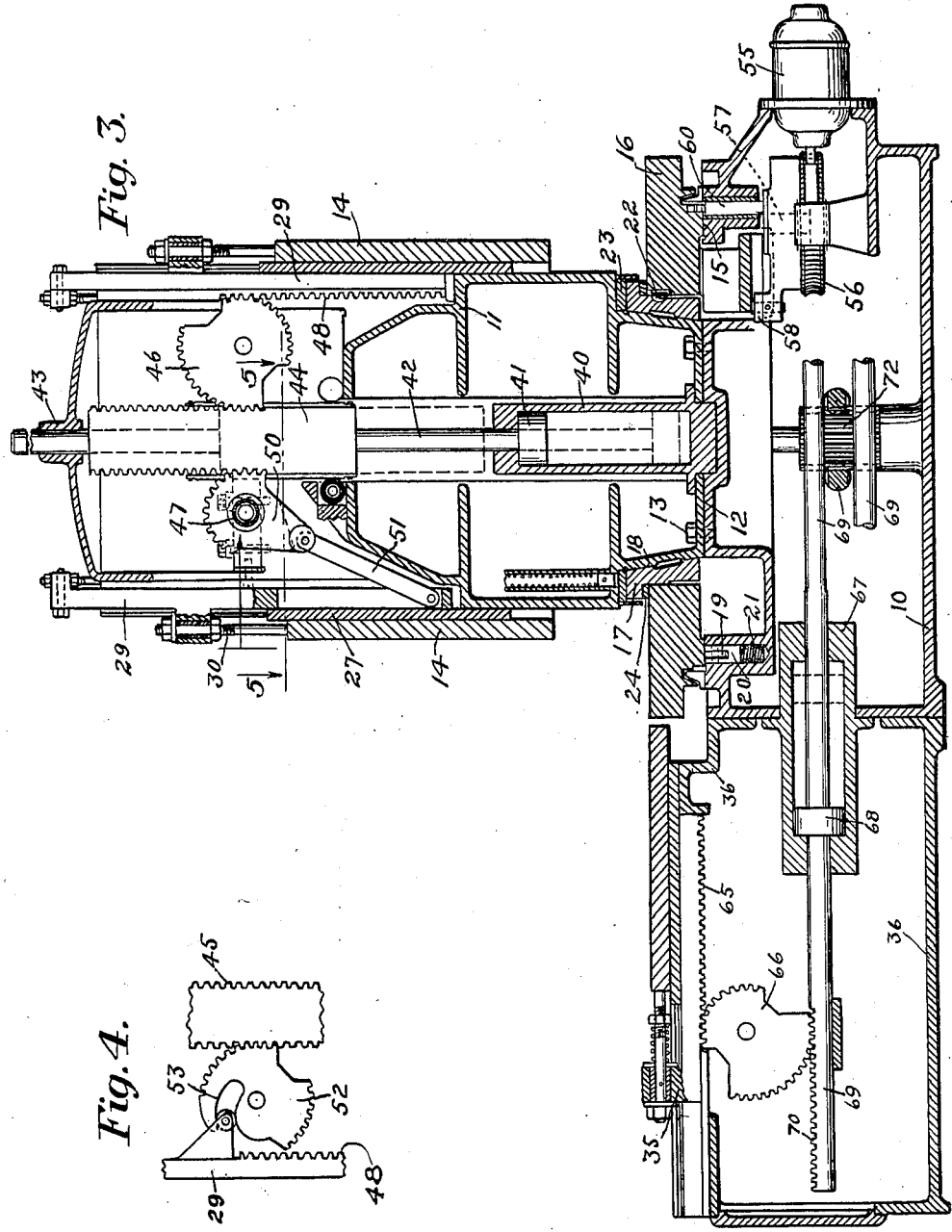
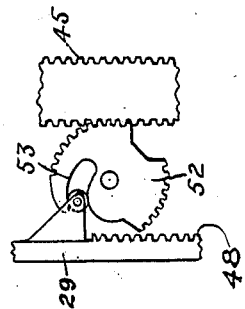
INVENTOR
Carroll Knowles
BY
ATTORNEY Patented May 9, 1933

1,907,550

UNITED STATES PATENT OFFICE

CARROLL KNOWLES, OF WEST HARTFORD, CONNECTICUT, ASSIGNOR TO PRATT & WHITNEY COMPANY, OF NEW YORK, N. Y., A CORPORATION OF NEW JERSEY

VERTICAL SPINDLE MACHINE TOOL

Application filed January 2, 1931. Serial No. 506,040.

This invention relates to machine tools and particularly to a machine having a plurality of tools for operating successively upon the same work piece.

A primary object of the present invention is to provide improved tool actuating mechanism for a metal cutting machine which will enable tools, suitably supported upon slides, to be fed individually toward and from the work pieces at any predetermined or desired speed to successively operate upon the same work piece.

Another object of the invention is to provide tool slides upon which the tools are mounted having hydraulic means for applying the power necessary to effect movement of the slides toward the work piece, one piston of the hydraulic mechanism serving to actuate all the slides of a group.

Another and more specific object of the invention is to provide positive connections between the hydraulic actuating piston and the tool carrying slides, these connections being arranged so that movement of any slide may be reciprocated at any desired speed relative to that of the piston and the other slides.

A further object of the invention is to provide a central column upon a base for supporting the hydraulic slide operating mechanism and a group of slides, improved means being employed for rotatably supporting a work supporting table about the column and upon the base.

And finally it is an object of the invention to provide a plurality of tool supporting and actuating slides which may be operated hydraulically in accordance with a predetermined cycle of operations.

With the above and other objects in view, my invention includes the features of construction and operation set forth in the following specification and illustrated in the accompanying drawings.

In the accompanying drawings annexed hereto and forming a part of this specification, I have shown my invention embodied in a machine tool having a central column supporting several tool carrying slides, but it will be understood that the invention can be otherwise embodied and that the drawings are not to be construed as defining or limiting the scope of the invention, the claims appended to this specification being relied upon for that purpose.

In the drawings:

Figure 1 is a front elevation of a complete machine incorporating the present invention.

Fig. 2 is a vertical cross sectional view taken centrally through the column and work supporting portions of the machine.

Fig. 3 is another central sectional view of a complete machine made in accordance with the present invention and shown without tools upon the slides.

Fig. 4 is a detail view of a part of the mechanism for actuating the tool supporting slides.

Fig. 5 is a horizontal view of the slide construction taken upon the line 5—5 of Fig. 3, an actuating means therefor being shown between the slide and the ram, and Fig. 6 is a fragmentary horizontal view of the table indexing and locking mechanism.

In the above mentioned drawings I have shown an embodiment of the invention including several modifications of operating connections for moving the tool slides, but it is to be understood that other changes and modifications may be made within the scope of the appended claims without departing from the spirit of the invention.

In the operation of machine tools it is desirable to have means for supporting work pieces in fixed positions upon a member within the machine tool while they are successively operated upon by a plurality of different tools. In the present form of machine tool shown in the drawings forming part of this application a machine tool is shown having a rotary work supporting carriage or table upon which work-holding fixtures may be suitably clamped in adjusted position, no rotation of the work during operation being contemplated in the present form of the invention. In order to properly operate upon work pieces with different tools, each tool or group of tools must be individually fed toward the work and returned to its initial or retracted position and for that purpose individual driving connections are provided. Each tool must be fed into the work during its operation at its own individual and proper speed and for predetermined distances, the varying tools of any one set-up being materially different one from another. In order to permit indexing movements of the work pieces and their table or carrier, all of the tools must be simultaneously disengaged from the work. While the work pieces remain in their indexed positions each individual tool moves longer or shorter distances during which its cutting operation may be performed, this being permitted by the movement of the slide upon which the tool may be mounted.

Referring more in detail to the figures of the drawings, I provide a large base 10 upon which may be mounted a central column 11. As shown in Fig. 3, a portion of this base is provided with a central horizontal surface 12 upon which the lower end of the column 11 may be fitted and secured in any preferred manner as by bolts 13. Upon this central column 11 are slidably arranged tool carriages or slides 14 to be referred to more in detail hereafter, their movements being parallel one to the other and preferably in vertical planes. Surrounding the column 11 and rotating upon a bearing surface 15 formed on the base is a work supporting table 16 of ring or annular form. This table 16 is supported upon the annular bearing 15 on the base and held in position to rotate about a fixed axis by a bearing upon a portion of the column presently to be referred to.

To facilitate the column 11 and table 16 being fitted in position relative to the base and to each other and to adjust for wear, an intermediate member 17 is employed rotatably fitting the column 11. This intermediate member 17 preferably engages a conical surface 18 upon the column 11 closely adjacent its attachment to the base 10. This intermediate member 17 also may be integral and of annular form similarly to the table 16. The bearing surface of the member 17 may be fitted to the column 11 prior to the mounting of the column upon the base 10. The table 16 also may be placed in its position on the base prior to mounting the column 11 and rests upon the horizontal annular bearing 15 upon the base 10 for free rotation.

In order to facilitate the indexing movements of the table 16 a portion of the weight of the table may be taken upon spring pressed rollers 19. These rollers 19 are mounted upon plungers 20 fitted within recesses in the base. Springs 21 force the plungers 20 upward so that the rollers 19 constantly support a major portion of the weight of the table 16 but permit it to be partially supported on the surface 15. Engaging an internal cylindrical surface of the table 16 is an outer cylindrical surface of the intermediate member 17. The table 16 is free to slide or adjust itself vertically upon this bearing and is drivingly connected to the intermediate member 17 by means of a key 22 in one member engaging a short recess or spline in the other member. The table 16 may therefore be fitted accurately to the intermediate member 17, and, after the column 11 and intermediate member 17 have been positioned upon the base 10, the spaces between the upper surface of the intermediate member 17 and the column 11 and between the table 16 and intermediate member 17 may be completely closed by segmental filler members 23 and 24.

Upon this table 16 may be mounted suitable fixtures 25 on or within which individual work pieces W may be supported. It will be understood that there will be a fixture for each blank or work piece W mounted on the table 16 and operated on by the tools at any one time, one additional fixture 25 also will be mounted on the table 16 to provide a convenient loading and unloading position for the operator. The work in this latter fixture is not engaged by any tool, the other fixtures 25 being positioned to properly position the work at the different stations of the machine for successive operation by the respective tools.

The slides 14 upon which the tool heads 26 are directly mounted are slidable upon ways formed upon a vertically disposed plate 27 fixed permanently to spaced projections 28 on the column 11. Preferably the slides 14 engage about the sides of this plate 27, clamping strips of the usual type being provided to properly retain the slides 14 in their position thereon. Within the recess formed between the projections 28 operates an actuating slide 29 adjustably connected to the slide 14 supporting the tool head by a suitable screw 30. The upper end of the screw 30 is slidable through a projection on the actuating slide 29, the opposite end being fixed within the tool carrying slide 14. By means of adjusting nuts 31 on the screw 30 on opposite sides of the projection the screw may be manually adjusted to position the tool holding slide 14 for particular tooling operations, the actuating slide 29 always being operated between the same positions.

The construction of each of the slides 14 and their actuating slides 29 may be similar upon each side of the column 11. The tool holders or heads 26 may be different upon the slides dependent upon what particular operation is to be performed at that station. As these tool heads 26 form no part of the present invention and may be constructed and actuated in any standard manner, further description is not thought to be necessary.

In addition to tool slides mounted upon the vertical column 11, slides 35 may be positioned upon extension bases 36 extending radially outward from the main base 10, one or more of these bases 36 being provided, each secured to a vertical wall of the main base. These bases 36, as shown in Fig. 2, have their tool slides 35 mounted for movement in horizontal planes radially toward and from the axis of the central column 11. The construction of these slides 35 and tool heads thereon may be similar in every way to that of the slides on the column.

In order to move the tool slides 29 and the parts thereon toward and from the work pieces on the table 16, hydraulic actuating means is employed for obtaining the necessary power. This hydraulic mechanism may include a cylinder 40 shown in Figs. 2 and 3 as being mounted vertically within the central portion of the column 11. Within this cylinder 40 operates a piston 41 having a piston rod 42 extending vertically above the cylinder and having a bearing 43 within the upper portion of the column 11. This piston rod 42 is provided with a ram 44 at an intermediate point. Upon this ram 44 are provided gear teeth 45 of rack form, a rack 45 being provided vertically disposed facing each slide 29 and adapted to be engaged by gear teeth of intermediate segmental gears 46. The segmental gears 46 have mountings 47 upon which they may oscillate which are secured to portions of the column 11. The actuating slides 29 are mounted for vertical reciprocatory movement parallelly to the ram 44 and their rear faces are provided with gear teeth 48 of rack form adapted to engage other segments of the segmental intermediate gears 46 engaging the racks on the ram.

It will be seen from the above description that upward movement of the piston 41 within its cylinder 40 and the vertical movement of the rod 42 and its ram 44 will oscillate the segmental gears 46 and force the tool actuating slides 29 downward. By varying the radii of the segments on the portions of the segmental gears 46 respectively engaging the teeth on the ram 44 and slide 29, the movement of a slide 29 may be made any predetermined amount relative to that of the piston 41 and ram 44. The segmental gear 46 may be supported upon a short shaft or stud within the bearing 47 within the column 11 for free oscillatory movement. Preferably these bearings and their mountings 47 are adapted to be positioned adjustably upon the supporting surface of the column 11 so that they may be adjusted to accommodate segmental gears of different forms and proportions. By the selection of a segmental gear 46 having the proper form and adjusting its bearing 47 so that the teeth of its segments engage the racks on the sleeve and slide, the length of movement and the tooling operations may be varied and properly performed at the different stations and the machine adjusted and equipped for a wide variety of work pieces.

In those instances where a tool supporting slide 14 must be given a particular movement as against a fixed stop for facing or other cutting operations, it may be preferred to have a connection such as shown at the left in Fig. 3. In this form of the operating connection for the slide 29 the segmental gear 50 engaging the ram 44 is oscillated through substantially a half revolution. On this segmental gear 50 and shown as being integral therewith, is an arm extending therefrom to the outer portion of which is attached a connecting rod 51, the opposite end of which pivotally engages a projection on the rear face of the actuating slides 29. With this construction the tool actuating slide 29 may be given a long movement, the speed not being uniform through the entire distance moved by the slide 29 due to the action of the connecting rod 51.

Another form of connection between the ram 44 and a slide 29 is shown in Fig. 4. In this form of connection a segmental gear 52 is supported upon a portion of the column similarly to the segmental gears 46. A segment of this gear has teeth engaging rack teeth 45 of the ram throughout the entire movement of the ram. The segment engaging the rack teeth 48 of the actuating slide 29 is in engagement during a portion of the stroke of the slide 29, preferably that portion when the tools carried by that slide are disengaged from the work piece and are being rapidly moved to or from their work engaging positions. Formed on the segmental gear 52 is a cam surface 53 of spiral form adapted to engage a roller 54 upon a rearward extension on a slide 29. The shape of the cam may be such that the movement may be extremely slow relative to that of the ram. Also the cam will be engaged just prior to disengagement of the gear teeth 48 so that the slide 29 will always be positively connected to and actuated by the ram.

The table 16 may be rotated to effect indexing movements by a motor 55 drivingly connected to the indexing mechanism as by means of a worm and worm wheel construction, the worm wheel 56 rotating upon a vertical shaft 57. A roller 58 on a radial extension of its upper portion of the worm wheel 56 directly engages radial slots 59 formed on the under surface of the table 16. This rotation of the table takes place in a step-by-step manner and is employed for the indexing movements of the table, the actuating means constituting a form of Geneva motion in which one revolution of the worm wheel 56 and its arm carrying the roller 58 indexes the table 16 from one station to the next. A locking pin 60 is employed to rigidly retain the table 16 in successive indexed positions during which periods operation takes place on the work pieces W by the tools. This pin 60 may be controlled by means of a cam surface 61 formed on the upper face of the worm wheel 56. As shown, the pin 60 has a lateral projection engaged by an overhanging portion of the cam 61. By this means the cam 61 may be used to retract the locking pin 60 from the table 16, a spring (not shown) being used to engage it within its recesses. As the indexing and locking mechanisms for the table 16 are or may be of a standard or well-known form, and also as these mechanisms form no part of the present invention, it is not thought that any further description thereof will be necessary.

As many horizontally movable slides 35 as desired may be employed, each being mounted on an individual base extension 36 and provided with rack teeth 65 upon its under side. These rack teeth 65 are engaged by gear teeth of segmental gears 66 in the same manner as the slides 29 upon the column 11. In order to actuate these horizontal slides 35 upon the extension bases 36 a single hydraulic cylinder 67 may be employed secured, as shown in Figs. 2 and 3, directly to the base 10 and extending into one of the extension bases 36. Within this cylinder 67 operates a piston 68 having a piston rod 69 extending beyond the opposite ends thereof. The rod extending outward from the cylinder 67 is provided with gear teeth 70 of rack form and engages the segmental gear 66 for one of the slides 35. As the operation of this segmental gear 66 is similar to those previously described in connection with the slides 29 on the column 11, it is not thought that further description will be necessary. The opposite end of the rod is extended to the axis of the group of horizontal operating slides and is provided with gear teeth of rack form. These rack form teeth mesh with the teeth of a central gear 72 mounted for rotation upon a central vertical axis. Engaging the teeth of the central gear 72 are rack teeth on the extension rods 69 extending inwardly from each of the other extension bases 36. By this means one single hydraulic cylinder 67 may be employed to actuate all of the horizontal slides 35 and, by virtue of the single gear 72 to which each of the slide operating rods 69 is attached, they are constrained to operate in synchronism with each other. By using the proper proportions for the portions of the segmental gears 66 between the racks 65 on the slides and on the outer ends of the rods 69, the movements of the slides 35 may be made of any desired lengths in the same manner as those upon the column 11. They will, however, each be started upon their inward feeding movement at the same time and each will be returned to its initial position after effecting operation upon the work piece at the same time, thus disengaging the tools from the work W and enabling the table 16 to be indexed.

At the upper end of the column 11 directly above one of the slides 29 is a contact 75. Similarly upon the outer end of one of the extension bases 36 is a contact 76. These contacts are provided for inclusion in suitable circuits for controlling the indexing motor 55. Until these contacts are moved by outward movement of the slides 36 and upward movement of the slides 29 to their limiting positions, the indexing motor 55 will be prevented from starting. By this means danger of the indexing motor starting with tools still in engagement with the work is eliminated. As this feature of the construction forms no part of the present invention, no further description is thought necessary.

What I claim is:

1. A machine tool comprising in combination, a base, a table mounted thereon, a column fixed to said base, tool supporting slides on said column movable toward and from said table, a cylinder fixed to said column, a fluid operated ram movable therein, and operative connections between said ram and slides to individually actuate said slides therefrom at predetermined different speeds.

2. A machine tool comprising in combination, a base, a table rotatably mounted thereon, a column fixed to said base, tool supporting slides movable on different sides of said column, a fluid operated ram, hydraulic operating means therefor within said column, and individual operative connections between said ram and slides to actuate said slides toward and from said table at predetermined different speeds.

3. A machine tool comprising in combination, a base, a table mounted thereon, a column fixed to said base, tool supporting slides movable on said column, a cylinder fixed to said column and having a fluid operated ram movable therein, hydraulic means to move said ram, and individual operative connections between said ram and slides to simultaneously actuate said slides toward and from the table at predetermined different speeds relative to that of the ram.

4. A machine tool comprising in combination, a base, a table mounted thereon, a column fixed to said base, tool supporting slides movable on said column, a cylinder within said column, a fluid operated ram therein movable parallelly to said slides, and individual gear connections between said ram and slides to move said slides simultaneously but at different predetermined speeds relative to said ram.

5. A machine tool comprising in combination, a base, a table mounted thereon, a column fixed to said base, tool supporting slides movable on said column, a cylinder within said column, a fluid operated ram therein movable parallelly to said slides, and gear connections between said ram and slides to move said slides simultaneously but at predetermined different speeds and in a direction opposite to said ram.

6. A machine tool comprising in combination, a base, a table mounted thereon, a column fixed to said base, tool supporting slides movable on said column, vertically disposed racks thereon, a cylinder within said column, a fluid operated ram therein movable parallelly to said slides, vertically disposed racks formed thereon, and individual gear connections between the racks on said ram and slides to simultaneously move said slides at any selected predetermined speeds relative to said piston.

7. A machine tool comprising in combination, a base, a table mounted thereon, a column fixed to said base, tool supporting slides on said column, a hydraulic cylinder fixed to said base, a fluid operated ram movable therein, gear teeth on said ram, gear teeth on said slides, and intermediate segmental gears between the gear teeth on said ram and on said slides.

8. A machine tool comprising in combination, a base, a table mounted thereon, a column fixed to said base, tool supporting slides movable on said column, a hydraulic cylinder fixed to said base, a fluid operated ram movable therein, vertically disposed gear teeth on said ram, vertically disposed gear teeth on said slides, and intermediate gear connections supported within the column and respectively engaging gear teeth on said ram and on said slides for individually actuating said slides toward and from said table at selected different speeds relative to the ram.

9. A machine tool comprising in combination, a base, a column having tool carrying slides thereon, a work supporting table, supporting means for said table on said base, an intermediate member engaging a bearing surface on said column and drivingly connected to said table, and means to rotate said table and intermediate member.

10. A machine tool comprising in combination, a base, a column having tool carrying slides thereon, a work supporting table, supporting means for said table on said base, an intermediate member surrounding said column and engaging a bearing surface thereon, a driving connection between said intermediate member and said table, said connection permitting vertical adjustment of said intermediate member relative to said table, and means to rotate said table and intermediate member.

11. A machine tool comprising in combination, a base, a column having tool carrying slides thereon, a table rotatably mounted on said base, an annular supporting bearing for said table on said base, and an intermediate member rotatably engaging a conical bearing surface on said column and drivingly connected to said table.

12. A machine tool comprising in combination, a base, a column having tool carrying slides thereon, a table rotatably mounted on said base, a horizontal supporting bearing for said table on said base, and an intermediate member engaging a bearing surface on said column and drivingly connected to said table for rotation therewith.

In testimony whereof, I hereto affix my signature.

CARROLL KNOWLES.